UNITED STATES PATENT OFFICE.

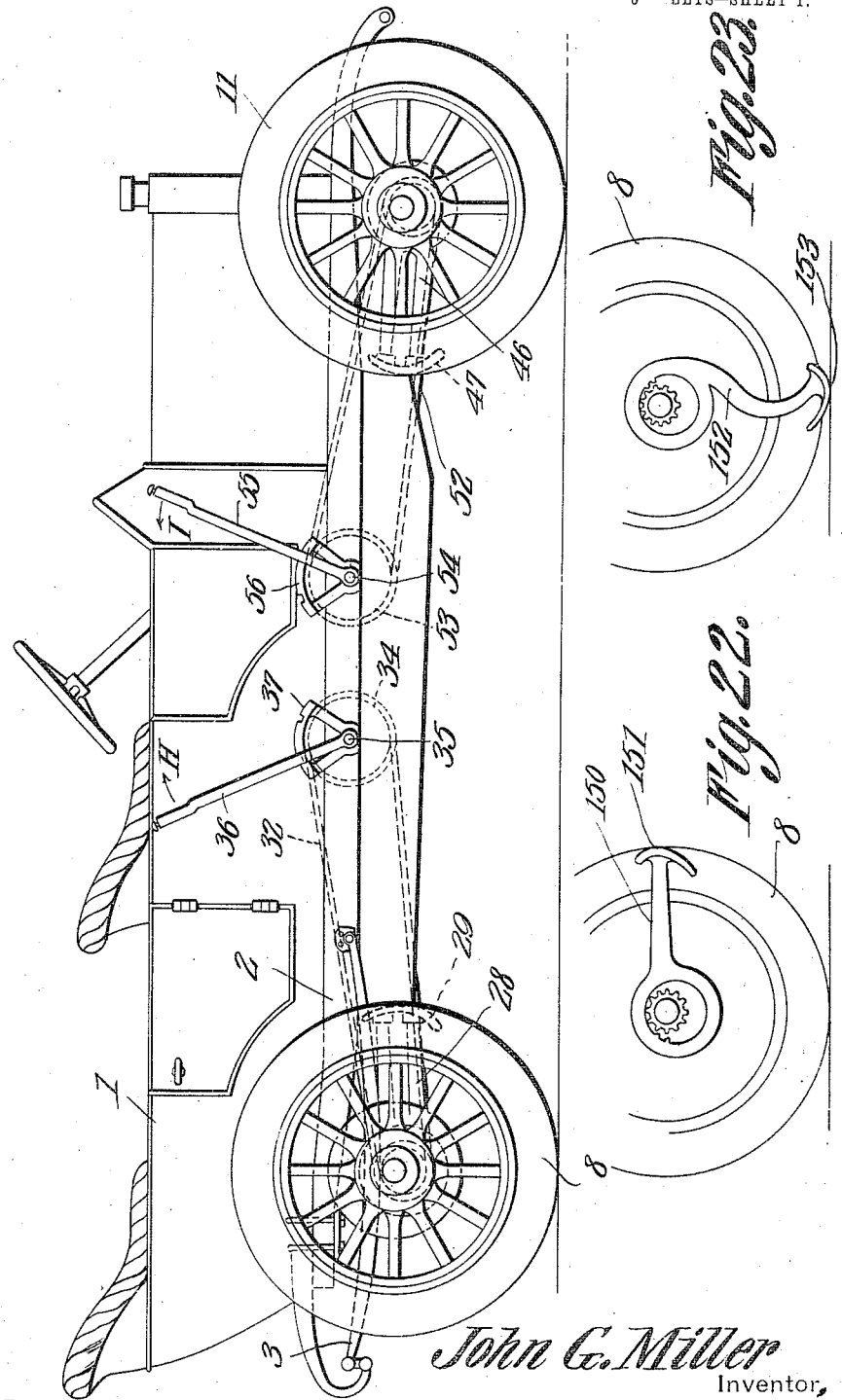

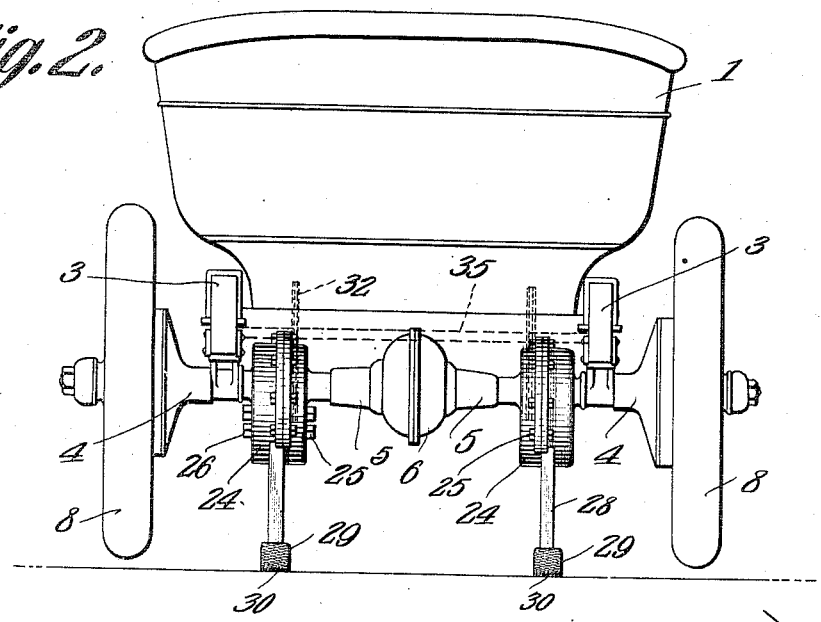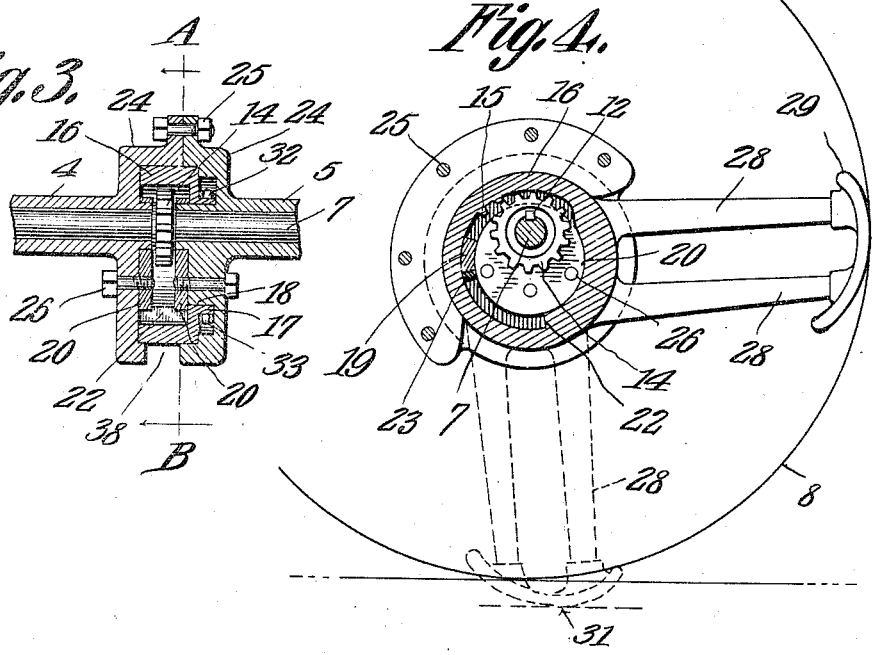

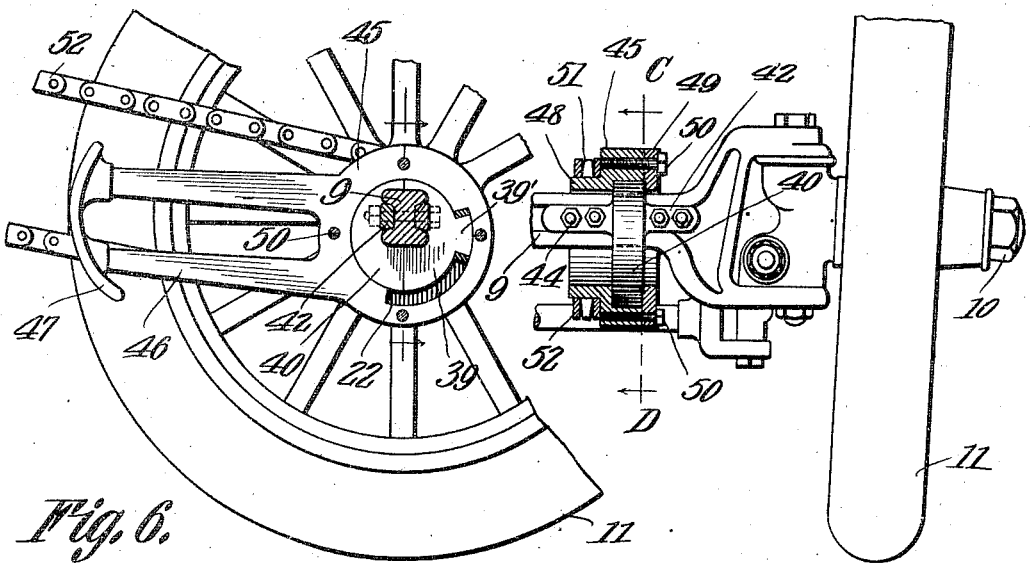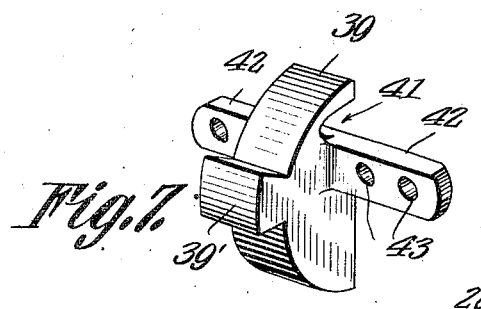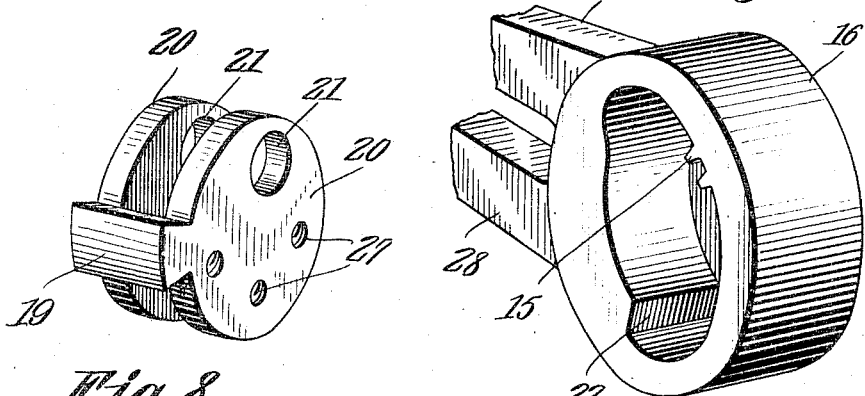

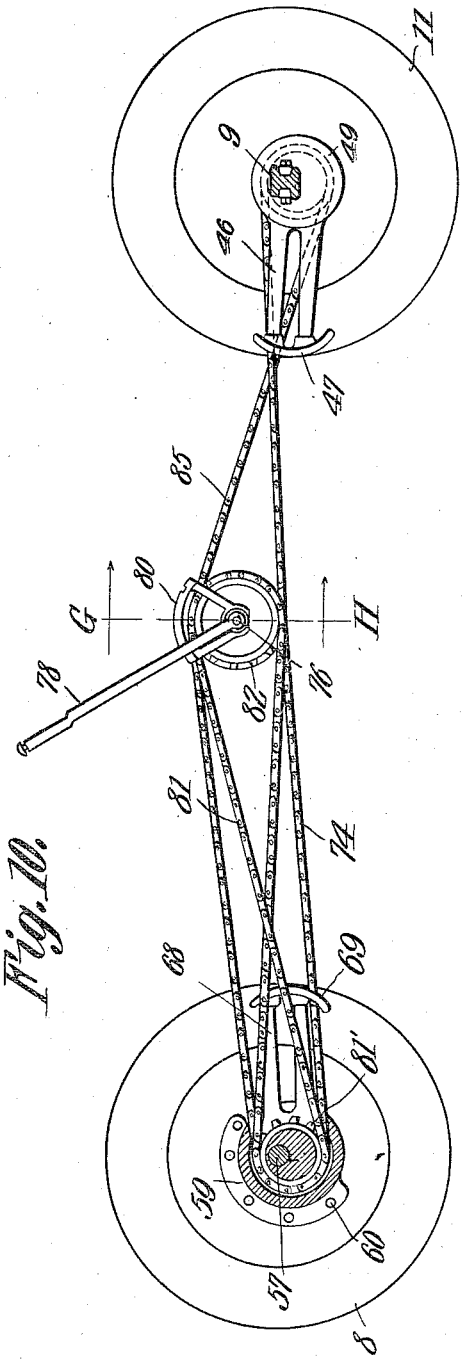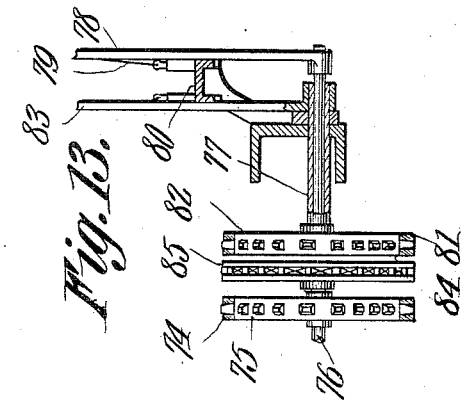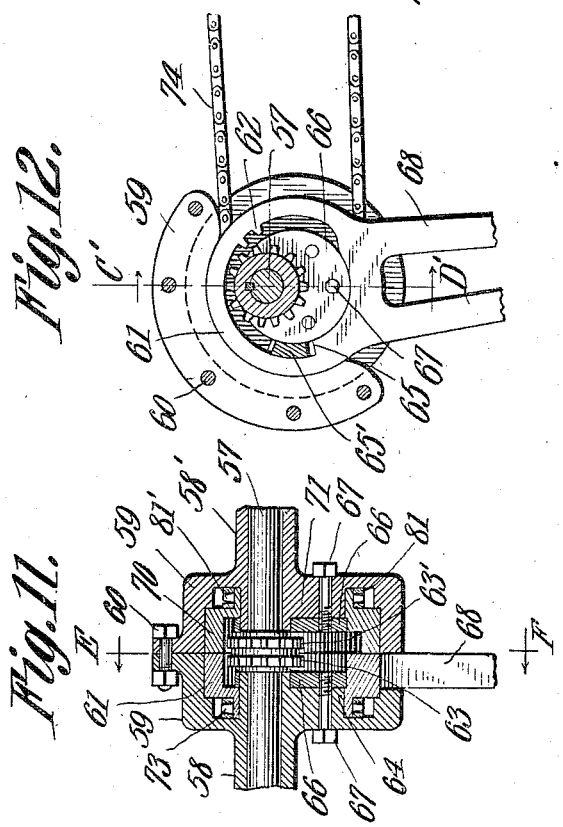

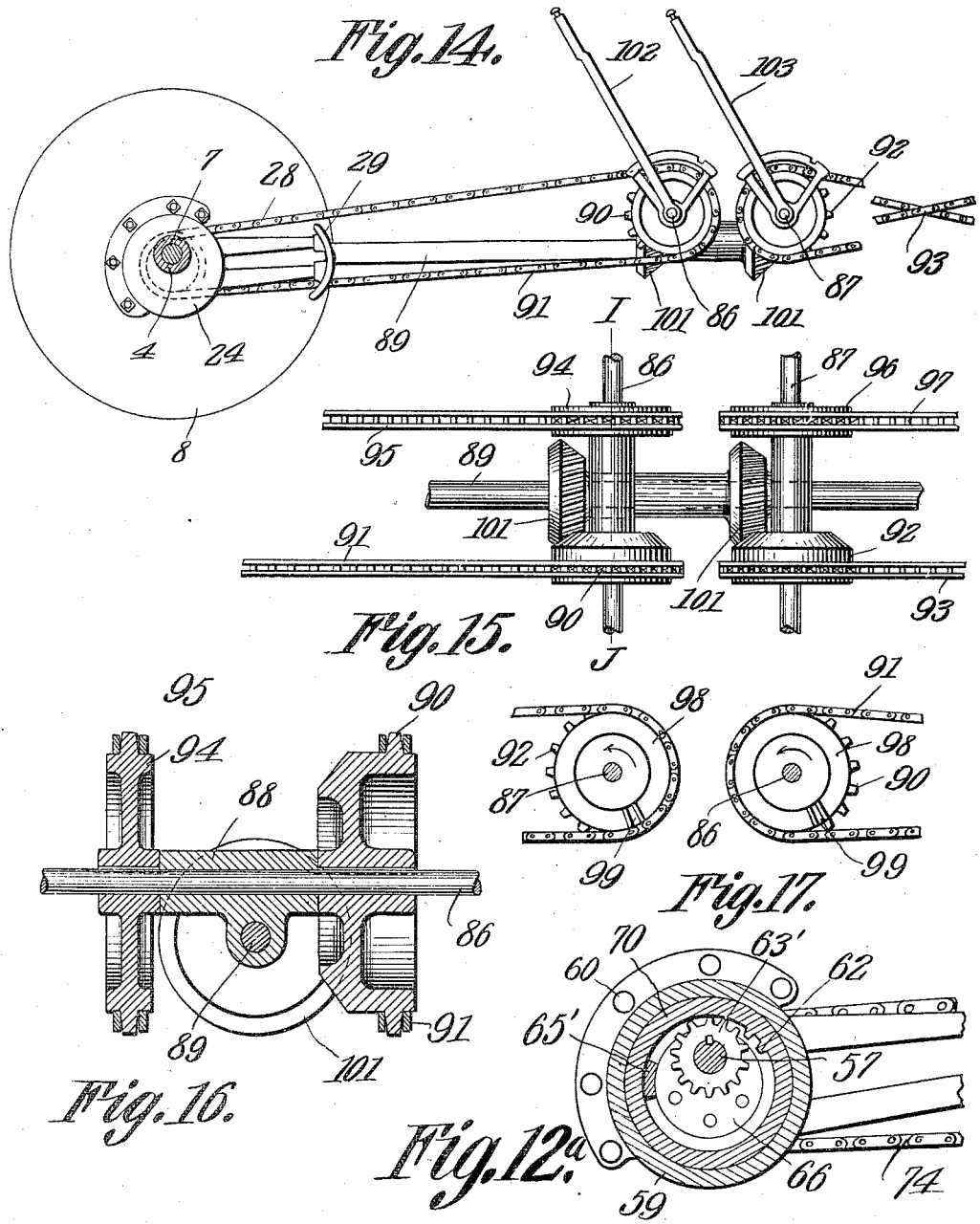

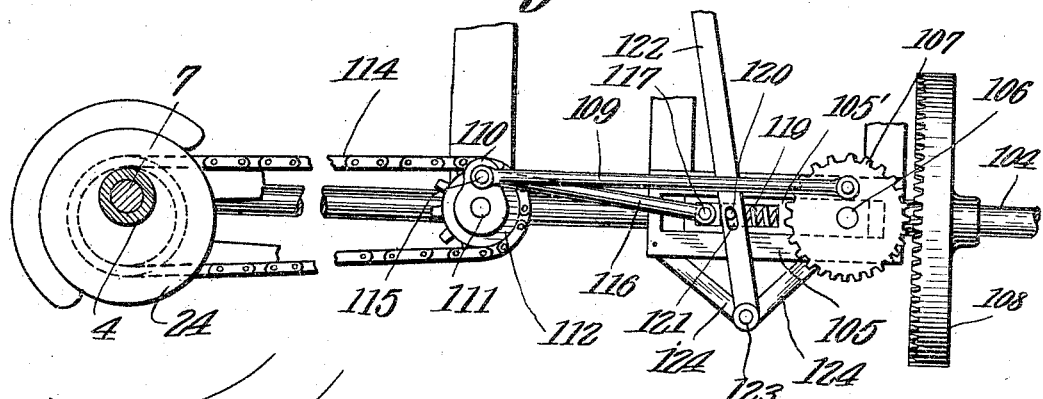
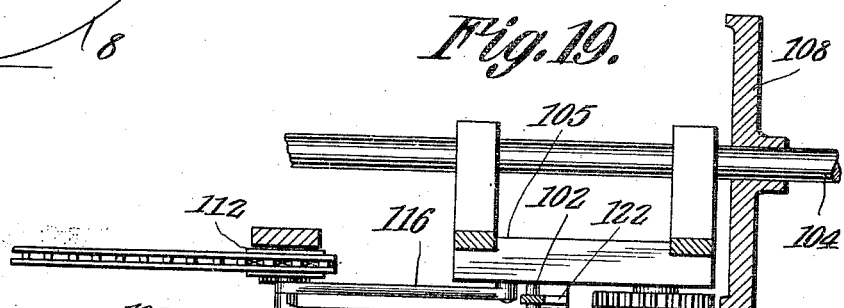
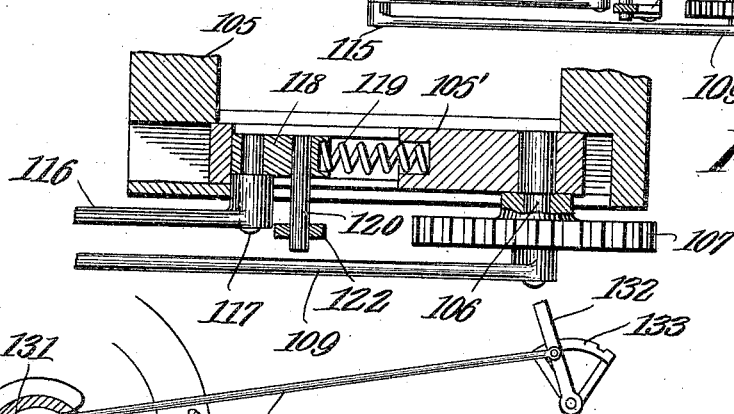
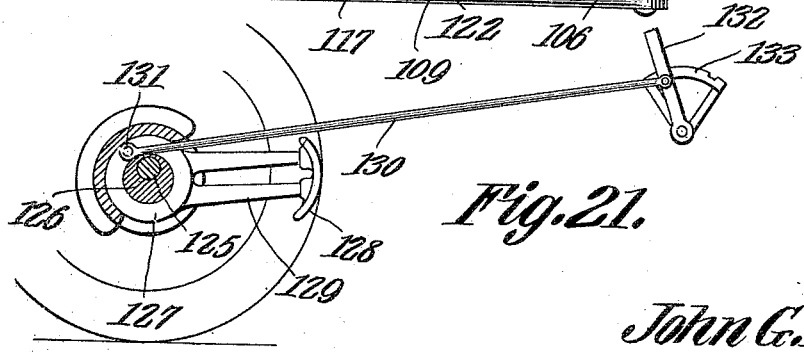

JOHN G. MILLER, OF BURLINGTON, IOWA.

VEHICLE-BRAKE.

1,018,627.  Specification of Letters Patent.  Patented Feb. 27, 1912.

Application filed January 16, 1911. Serial No. 603,017.

*To all whom it may concern:*

Be it known that I, JOHN G. MILLER, a citizen of the United States, residing at Burlington, in the county of Des Moines and State of Iowa, have invented a new and useful Vehicle-Brake, of which the following is a specification.

It is the object of this invention to provide a novel form of brake, adapted to be suspended from the axle of a vehicle, to be lowered into contact with the ground, so as to lift the axle of the vehicle and the wheels thereon free from the ground, a further driving of the vehicle being thereby rendered impossible. Another object of the invention is to provide novel means whereby such a brake may be manipulated.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows in side elevation, a vehicle equipped with one form of the invention; Fig. 2 is a rear elevation of a vehicle equipped with one form of the invention, the view depicting the parts in the positions which they will assume after the brake has been brought into contact with the ground, so as to lift the wheels clear therefrom; Fig. 3 is a vertical transverse section through a portion of the rear axle of the vehicle, parts being shown in elevation; Fig. 4 is a vertical section in the line A—B of Fig. 3, parts being removed; Fig. 5 is a fragmental vertical section of the mechanism whereby the forward brake is assembled with the forward axle, parts being shown in elevation; Fig. 6 is a vertical transverse section upon the line C—D of Fig. 5; Fig. 7 is a detail perspective of one of the bracket members whereby the forward brake head is connected with the vehicle axle; Fig. 8 is a detail perspective of the stop mechanism, whereby the movement of the brake head upon the axle is limited; Fig. 9 is a detail perspective of the brake head and of the arm whereby the brake shoe is carried, parts being broken away; Fig. 10 is a side elevation, diagrammatic in nature, and showing a modified form of the invention, wherein the brake which is adjacent the front of the vehicle, is power-set from the rear, driving axle of the vehicle; Fig. 11 shows a portion of the device depicted in Fig. 10 and is a vertical transverse section taken in the line C'—D' of Fig. 12, parts being broken away, and parts being shown in elevation; Fig. 12 shows a portion of the device depicted in Fig. 10 and is a vertical transverse section in the line E—F of Fig. 11; Fig. 13 is a vertical transverse section in the line G—H of Fig. 10, parts being shown in elevation, the view being designed to show the lever mechanism whereby the brakes are actuated; Fig. 14 is a side elevation, diagrammatic in nature, and showing a modified means whereby the brakes may be set; Fig. 15 is a fragmental top plan of the structure depicted in Fig. 14; Fig. 16 is a vertical transverse section in the line I—J of Fig. 15, parts being shown in elevation; Fig. 17 is a vertical section, taken longitudinally of the vehicle, and showing the inner faces of certain of the sprocket wheels, the view being diagrammatic in nature, and having for its end, primarily, the showing of the broken pinions upon said sprocket wheels; Fig. 18 is a diagrammatic side elevation, showing a modified means for applying the brake, parts being broken away; Fig. 19 is a top plan of the structure shown in Fig. 18, parts being broken away and sectioned; Fig. 20 is a horizontal section of the structure shown in Fig. 19; Fig. 21 is a diagrammatic side elevation, showing a modified means for applying the brake; Figs. 22 and 23 are diagrammatic side elevations showing modified means for mounting the brake shoes; and Fig. 12$^a$ is a vertical section in a plane slightly to the right of the plane E—F of Fig. 11.

The device forming the subject matter of this application, is adapted to be employed in vehicles of any sort, but, in the drawings, in order to illustrate a concrete embodiment, and referring particularly to Fig. 1, the vehicle has been delineated in the form of a motor propelled passenger car, the body whereof is denoted generally by the numeral 1.

The numeral 2 denotes generally, the frame of the vehicle, and the numeral 3 the spring at the rear of the frame, the springs 3 carrying, as seen most clearly in Fig. 2, outer casings 4 and inner casings 5, the inner casings uniting to form the box 6 in which the differential is commonly housed. It is in these casings 4 and 5, that the rear axle 7, being power-driven, is journaled for rotation, the rear axle carrying the rear wheels 8.

Noting particularly Fig. 6, the front axle of the vehicle is denoted by the numeral 9, the front axle carrying the movable axle ends 10. At this point it may be stated that the showing of the front axle and of the movable ends thereof, is purely conventional, these details ordinarily varying with the different makes of machines, the construction of the forward axle being of no particular consequence in the present invention. The forward wheels of the vehicle, carried by the movable ends 10, are denoted by the numeral 11.

Referring to Figs. 3, 4, 8 and 9 for a clearer understanding of the construction whereby the rear brakes are operatively connected with the rear axle 7, it will be seen that by means of keys 12, pinions 14 are secured to the rear axle 7, between the wheels 8 and the differential box 6. At this point it may be stated profitably that the rear axle includes duplicate brake mechanisms, but one of which will be described specifically, it being understood that this description will apply with equal propriety to both brake mechanisms. Each pinion 14, then, is adapted to engage, but is normally out of engagement with, a rack 15, formed in the inner face of an annular head 16, the head 16 being provided with an outstanding flange 17, fitting rotatably about a bearing 18 formed upon the outer end of the outer casing 5. As Fig. 3 will serve to show, the center of this bearing 18 is disposed out of the axis of the rear axle 7, the bearing, therefore, acting as an eccentric, upon which the annular head 16 may have a limited rotation, eccentrically with respect to the rear axle 7.

Referring particularly to Fig. 8, and comparing the same with Figs. 3 and 4, a stop 19 is shown, formed integrally with the peripheral portions of two parallel disks 20, these disks 20 having openings 21, whereby the disks may be mounted upon the rear casings 4 and 5. The openings 21 are eccentrically disposed in the disks 20, so that the relative positions of the disks 20 and the bearing 18 will be coincident. In the intrados of the annular head 16, a shoulder 22 is formed, the stop 19 being provided with resilient facing material 23, so as to lessen the shock when, as hereinafter described, the shoulder 22 in the annular brake head 16, comes into contact with the stop 19.

The casings 4 and 5 are formed at their meeting ends with heads 24, peripherally bolted together as at 25, or otherwise secured. These heads 24 serve to house the actuating portions of the brake mechanism, and they preferably serve as a means for maintaining the disks 20 and the stop 19 in fixed position. In order thus to position the stop 19 rigidly, bolts 26, or other securing elements adapted to a like end, may be extended through the side walls of the heads 24, to register in suitable openings 27 (Fig. 8) formed in the disks 20.

The brake head 16 is equipped with an outstanding two-part arm 28, carrying at its outer end a segmental brake shoe 29. When, as shown in Fig. 4, the arm 28 is disposed in substantially horizontal position, the brake shoe 29 will be retracted within the periphery of the wheel 8, the brake shoe being ordinarily concealed by the rim of the wheel, and the component elements of the arm 28 being concealed by the spokes of the wheel, so that the brake will detract nothing from the general appearance of the vehicle.

It has been pointed out hereinbefore, that the brake head 16 is eccentrically suspended with respect to the rear axle 7, and therefore, when the brake arm 28 moves from the solid line position of Fig. 4 into the upright, dotted line position there shown, the brake shoe 29 will be projected beyond the periphery of the wheel 8. When the brake shoe 29 is positioned as shown in dotted line in Fig. 4, the shoulder 22 in the annular brake head 16, engaging the stop 19, will hold the arm 28 of the brake in the position shown in dotted line in Fig. 4. Moreover, the coöperation between the shoulder 22 and the stop 19 is such that the point of contact between the brake shoe 29 and the ground, denoted specifically by the numeral 31 in Fig. 4, will be in advance of the center of the rear axle 7. By reason of this construction, as soon as the forward sliding movement of the vehicle upon the brake shoe 29 ceases, the vehicle will tilt rearwardly on the brake shoe 29, and into contact with the ground. This operation results from the proper positioning of the shoulder 22 and of the stop 19, and is entirely independent of the form given to the two-part arm 28 of the brake, which said arm may be modified as desired. Noting particularly Fig. 2, it will be seen that the lower faces of the brake shoes 29 may be roughened slightly, as shown at 30, to present an anti-slipping surface.

Noting particularly Fig. 3, it will be seen that the flange 17 of the annular brake head 16 is equipped with a sprocket 33, about which is passed a sprocket chain 32, trained over a wheel 34, mounted upon a frame-carried shaft 35, the wheel 34 being rotatable by a lever 36, the movement of which may be limited in the ordinary manner, by engagement with a segment 37. In order that the brake shoe may be set by the manipulation of the lever 36, one of the heads 24, preferably the head which is formed upon the outer casing 4, is cut away, as denoted by the numeral 38 in Fig. 3, to permit the downward swinging of the arm 28 of the brake, from the position shown in solid line in Fig. 4, into the position shown in dotted line therein.

The brake which is disposed adjacent the forward end of the vehicle, may be supported in any desired manner. In order, however, to present a concrete embodiment, the forward brake mechanism is in the present instance mounted upon the forward axle 9, although this construction is by no means compulsory.

When the forward brake mechanism is carried by the forward axle 9, the brackets, seen most clearly in Fig. 7, are applied to the forward and rear faces of the front axle. These brackets comprise bearing blocks 39 and 40, the adjacent faces of which may be notched, as shown at 41, in order to receive the forward axle 9 which is commonly an eye beam. The blocks 39 and 40 are supplied with laterally projecting arms 42, having openings 43, adapted to receive securing elements 44, whereby the brackets may be connected with the forward axle 9. The construction of these brackets is identical, saving for the fact that the block 39 of one bracket is equipped with a radial projection 39', having the function attributed to the stop 19 of Fig. 8. The blocks 39 and 40 are eccentrically disposed with respect to the forward axle 9, as an inspection of Figs. 6 and 7 will clearly show.

Mounted for rotation upon the bearing blocks 39 and 40, is a head 45, the construction of which is substantially the same as that of the head 16, Fig. 9 serving to illustrate the construction of both of the heads 45 and 16. The head 45 is shouldered, as shown at 22 in connection with the head 16, for engagement with the projection 39' of the bearing block 39.

The head 45 is equipped with a rearwardly projecting, two-part arm 46, carrying a segmental shoe 47, the construction being similar to that described in connection with the rear brake mechanism, the shoe 47 being within the periphery of the wheel 11 when the two-part arm 46 is uplifted, the shoe, however, advancing beyond the periphery of the wheel when the shoe is lowered, so as to lift the front wheel 11 off the ground, as will be clearly understood.

The flange 48 of the head 45 defines a shoulder in the interior of the head, adapted to bear against one side of the bearing blocks 39 and 40. In order to prevent the brake head 45 from sliding in an opposite direction, an annular securing member 49 is attached to the outer face of the brake head 45, the securing member being held in place by connecting elements 50, extended into the brake head 45, the securing member 49 overlapping the outer faces of the bearing blocks 39 and 40. Upon the flange 48 of the head 45, a sprocket 51 is fashioned, about which is passed a chain 52, trained about a wheel 53, carried by a frame-supported shaft 54, the wheel 53 being manipulable by means of a lever 55, adapted to engage a segment 56, as clearly shown in Fig. 1.

The operation of the device as thus far described, is as follows. Presupposing that it is desired to set the brake mechanism which is carried by the rear axle 7, if the upper end of the lever 36 be swung in the direction of the arrow H in Fig. 1, the chain 32 will rotate the annular brake head 16 upon its bearing 18, and by reason of the fact that this bearing 18 is eccentric with respect to the rear axle 7 and the pinion 14, the brake head 16 by the manipulation of the lever 36, will be lowered until the rack 15 upon the brake head meshes into the pinion 14. Since the pinion 14 is held for rotation with the rear axle 7, the engagement between the rack 15 and the pinion 14 will serve to swing the arm 28 downwardly, bringing the brake shoe 29 into contact with the ground, and lifting the rear wheels 8 free from the ground. The rack 15, by the time that the arm 28 is positioned as shown in Fig. 4, will have passed out of mesh with the pinion 14, so that the rear axle 7 may continue to rotate under the action of the engine, without propelling the vehicle forwardly, and without further influence upon the brake shoe 29, the engagement between the shoulder 22 of the brake head 16, and the stop 19, serving to maintain the braking mechanism in the position shown in dotted line in Fig. 4.

The operation last above described will take place when the vehicle is moving upon level ground, or down hill. It not infrequently happens, however, that when a vehicle is ascending the grade, some accident to the vehicle mechanism occurs, whereupon the vehicle starts to run down hill, backwardly. In order to obviate this difficulty, the braking mechanism which is carried by the front axle 9 may be brought into operation. Under such circumstances, the mechanism is manipulated as follows. By moving the upper end of the lever 55 in the direction of the arrow I in Fig. 1, the wheel 53 will be rotated, the chain 52 causing a rotation of the brake head 45 upon the bearing blocks 39 and 40, the brake shoe 47 being swung downwardly, manually, to project beyond the periphery of the forward wheel 11, and to lift the forward wheel 11 off the ground, the projection 39 serving to maintain the arm 46 in rearwardly inclined position, whereupon the brake shoe 47, riding over the surface of the ground, will bring the vehicle quickly to a stop. At this point it may be stated that although one end only of the forward axle 9 is shown, it is to be understood that both ends of the forward axle are equipped with duplicate brake mechanisms, after the manner of the showing with respect to the rear axle.

From the foregoing it will be seen that the operator of the vehicle may readily stop its forward or rearward progress by manipulating the levers 36 and 55, respectively, the rear axle being elevated in the one instance, so that the wheels 8 are lifted free from the ground, thereby rendering the power driven wheels 8 inefficient to propel the vehicle forwardly. Likewise, when the braking mechanism at the forward end of the vehicle is applied, the forward wheels 11 will be lifted clear of the ground.

It is to be noted that when either of the braking mechanisms are applied, the skidding takes place entirely upon the brake shoes 29 and 47, and not upon the tires which the wheels carry. This fact is important for two reasons. In the first place, the wheels are protected from the wear incident to the sliding of a locked, non-rotatable wheel over the surface of the ground. In the second place, by reason of the fact that the device herein disclosed, subjects the tires to no severe usage when the braking mechanism is applied, the occupant of the vehicle will not hesitate to apply the brake, upon the slightest occasion for its use, it frequently happening that, through fear of wear and tear upon the tires, the application of the braking mechanism of the ordinary construction, is delayed until, when at last the brakes are applied, the impending accident cannot be averted.

Referring to Figs. 10, 11, 12, 12ª and 13, a modified form of the invention is shown, wherein the power driven rear axle 57 is made efficient as a means for setting the forward brake shoe, it being recalled that in that form of the invention shown in Figs. 1 to 7, the forward brake shoe is applied manually.

In Figs. 10, 11, 12, 12ª and 13, the rear axle 57 is surrounded by casings 58 and 58', equipped with coöperating heads 59, peripherally bolted together as at 60, or otherwise united. The annular brake head 61 is provided in its interior with a rack 62, normally out of engagement with, but adapted to engage, a pinion 63, formed integrally with a parallel pinion 63', both of which are secured to the axle 57. The annular brake head 61 is rotatably mounted upon a bearing 64, formed in the inner face of the head 59 of the casing 58, the bearing 64 being eccentrically disposed with respect to the rear axle 57. In the intrados of the annular head 61, there is formed a shoulder 65 adapted to come in contact with a stop 65', carried by disks 66, through which the shaft 57 is inserted, the construction being the same as that shown in Fig. 8. The disks 66 are held against rotation by means of bolts 67, extended through the heads 59. The brake head 61 is equipped with a two-part arm 68, carrying a brake shoe 69, the operation of the brake shoe 69 with respect to the stop 65' being the same as that described in connection with the preceding form of the invention. Another annular head 70, similar in construction to the head 61, and equipped with a fragmental rack 62' adapted to mesh into the pinion 63', is mounted upon an eccentric bearing 71 formed in the head 59 of the casing 58'. This annular head 61 is equipped with a sprocket flange 73, about which is extended the sprocket chain 74 trained about the sprocket wheel 75, carried by a shaft 76, rotatably mounted within a tubular shaft 77, the latter being frame-supported. For the manipulation of the shaft 76, a lever 78 is provided, the same being equipped with suitable latch mechanism 79, adapted to interlock with the frame-carried segment 80. A chain 81 is passed about the sprocket flange 81' of the annular head 70, the chain 81 being trained around the sprocket wheel 82 secured to the tubular shaft 77. The shaft 77 is manipulable by means of a lever 83, constructed similarly to the lever 78. Secured to the tubular shaft 77, between the sprocket wheels 75 and 82, is an intermediate sprocket wheel 84, about which is passed a chain 85, the chain 85 being trained around the sprocket 51 of the forward brake mechanism (see Fig. 6), it being understood, without specific illustration, that the forward brake mechanism shown in Figs. 5 and 6 is employed in that form of the invention which is shown in Fig. 10.

The operation of the device as shown in Figs. 10, 11, 12, 12ª and 13, is as follows. Let it be supposed that it is desired to set the rear brake mechanism alone. Under such circumstances, the lever 78 is manipulated, actuating the chain 74 and rotating the brake head 61 upon its eccentric bearing 64 to bring the rack 62 into mesh with the pinion 63, whereupon, when the rear axle 57 is actuated, after the manner of the device shown in Fig. 1, the rear brake will be set. When it is desired to set the forward brake mechanism, the lever 83 is manipulated, the chain 81 actuating the annular head 70 until its rack, corresponding to the rack 62 of Fig. 12, is brought into mesh with the rotating pinion 63'. The head 70 will thus be rotated, the chain 81 causing a rotation of the sprocket wheel 82 and of the intermediate sprocket 84, the latter sprocket, through its chain 85, actuating positively, the forward brake mechanism, the initial movement of which will have taken place under the primary movement of the lever 83.

In order to render the foregoing description clear, it may be necessary to point out the conditions which make necessary a setting of the forward brake member 47 in Fig. 10, and in this connection, let it be supposed that through a breakage of the mechanism, no power is supplied to the rear axle 57. Let it be supposed that the vehicle is running wild, backwardly, down-hill, the axle 57 having a rearward rotation. Note Fig. 12ᵃ and observe that when the forward brake member 47 is uplifted, as shown in Fig. 10, the rack 62′ of the annular head 70 stands spaced from, and to the front of, the pinion 63′. In order to bring the rack 62 of the brake head 61 into engagement with the pinion 63, thereby effecting a lowering of the rear brake shoe, the brake head 61 must be rotated forwardly; while, to bring the rack 62′ of the brake head 70 into engagement with the pinion 63, the head 70 must be rotated rearwardly. Since the brake heads 70 and 61 must be rotated in opposite directions, the chain 81 must be crossed, if the levers 78 and 83 are to be moved in a common direction, to effect the braking operation. Noting in Fig. 10, that the rotatable element carrying the forward brake shoe 47, must be rotated in an opposite direction from the rotatable element carrying the rear brake shoes 69, it will be obvious that the chain 85 must be crossed.

From the foregoing it will be seen that either the forward brake mechanism or the rear brake mechanism, may be set independently of the other, from the power driven rear axle 57.

In Figs. 14, 15, 16 and 17, a modified form of the invention has been shown. In this form, the forward and rearward brakes may be set positively from the engine shaft. In this form of the invention, the brake mechanism for the rear axle is the same as that shown in Figs. 3 and 4, the brake mechanism for the forward axle being the same as that shown in Fig. 6. A specific description of these two brake mechanisms, and of their operation, is unnecessary, since the same will be readily understood from the description of the operation of the structures shown in the figures above mentioned. In this form of the invention, spaced shafts 86 and 87 are journaled for rotation upon the vehicle frame, transversely of the same, the shafts, if desired, being mounted in a common bearing 88 with the engine shaft 89 which extends longitudinally of the vehicle. A sprocket wheel 90 is secured to the shaft 86 at one side of the vehicle, and about the sprocket wheel 90 is trained a chain 91, extending rearwardly to actuate the rear brake mechanism hereinbefore described. A similar sprocket wheel 92 is secured to the shaft 87, and about the wheel is passed a chain 93, extended forwardly, to actuate the forward brake mechanism upon one side of the vehicle. To the shaft 86, a sprocket wheel 94 is secured, a chain 95 being extended around the sprocket wheel 94, and passed rearwardly, to actuate the rear brake mechanism, upon the opposite side of the vehicle from the mechanism which is actuated by the chain 91. To the shaft 87, a sprocket wheel 96 is secured, a chain 97 being passed about the sprocket wheel 96 and carried forwardly, the chain 97 coöperating with the chain 93 in actuating the forward brake mechanism upon both sides of the vehicle. The sprocket wheels 90 and 92 are equipped with beveled faces 98, the beveled faces carrying broken gears 99, the extent of which may be dictated by the taste of the manufacturer. Secured to the engine shaft 89, for rotation therewith, are beveled pinions 101, adapted to be engaged under circumstances to be pointed out hereinafter, by the broken gears 99 of the sprocket wheels 90 and 92. The shaft 86 is actuated by a lever 102, and the shaft 87 is actuated by a lever 103.

The operation of the device as shown in Figs. 14, 15, 16 and 17 is as follows: When it is desired to set the rear brake mechanism, the lever 102 may be manipulated, rotating the sprocket wheel 90, until its broken gear 99 is brought into engagement with the adjacent beveled pinion 101. Under such circumstances, the engine shaft 89, rotating said beveled pinion 101, will give a partial rotation to the sprocket wheel 90, which rotation will be communicated by the shaft 86, to the sprocket wheels 90, 94, both of the chains 91 and 95 being actuated, to set the rear brake mechanism. When it is desired to set the forward brake mechanism, the lever 103 is manipulated, rotating the sprocket wheel 92, until its broken gear 99 meshes into the other beveled pinion 101, whereupon the chains 93 and 97 will be actuated, thereby to set the forward brake mechanism of the vehicle.

In Figs. 18, 19 and 20, a further modification in the means for applying the brakes, is shown. Referring to Figs. 18, 19 and 20, the engine shaft 104 carries a rigidly supported frame 105 carrying a slidably mounted block 105′, provided with an outstanding shaft 106, carrying an upright pinion 107, out of engagement with, but adapted to mesh into, a pinion 108 secured to the engine shaft 104. A connecting rod 109 unites the pinion 107 with a crank arm 110, secured to a frame-supported shaft 111, carrying a sprocket wheel 112, about which is passed a chain 114, leading to the rear brake mechanism. The pivot element 115 whereby the connecting rod 109 is united with the crank 110, serves as a mounting for a forwardly extended link 116, pivotally connected as shown at 117, to a block 118, slidable in the block 105' longitudinally of the same, the sliding movement of the block 118 being limited, by a compression spring 119, the forward end of which bears against the block 105', the rear end of the spring bearing against the block 118. Outstanding from the block 118, is a pin 120, adapted to register in a slot 121, in an upright lever 122, fulcrumed at 123 upon suitable projections 124 from the vehicle frame.

The operation of the device as shown in Figs. 18, 19 and 20 is as follows. When the parts are disposed as shown in Fig. 18, the pinion 108 upon the engine shaft 104, is out of mesh with the pinion 107 which is carried by the slidably mounted block 105'. If, however, the upper end of the lever 122 be swung forwardly, the block 105' will be advanced in the block 105, until the pinion 107 meshes into the pinion 108. The pinion 108 being rotated by the engine shaft 104, will impart a rotation to the pinion 107, the connecting rod 109 tilting the crank arm 115, and rotating the shaft 111, the sprocket wheel 112 advancing the chain 114, to set the rear brake mechanism, it of course being understood that the rear brake mechanism is of the form shown in Figs. 3 and 4, and previously described. The rotation of the shaft 111, will through the instrumentality of the rod 109 and the link 116, retract the block 105', drawing the pinion 107 out of mesh with the pinion 108. Throughout the foregoing description, belts and pulleys have been employed for setting the several brake mechanisms, but this construction need not be adhered to rigidly. For instance, as shown in Fig. 21, the rear axle 125, operatively carrying the bearing 126, corresponding to the bearing 18, and likewise carrying the brake head 127, corresponding to the brake head 16, may be employed for actuating the shoe 128 at the end of the arm 129, the head 127 being actuated through the instrumentality of a connecting rod 130, pivoted as shown at 131 to the brake head 127, the connecting rod 130 being pivoted to a lever 132, adapted to engage with a segment 133, the lever and the segment being supported upon the vehicle frame, upon the vehicle body or in any other desired manner.

Reviewing the several forms of the invention shown, it will be seen that the occupant of a vehicle, by the simple starting of a lever, may set a brake mechanism which will not only lift the wheels of the vehicle free from the ground, so that the wheels will no longer impel the vehicle, but, as well, serve to prevent any damage upon the tires of the wheels, through skidding over the surface of the ground.

As shown in Fig. 22, the arm 150, carrying the brake shoe 151, may consist of a single, straight rod, instead of two such rods, as shown at 28 in Fig. 4. Likewise, as shown in Fig. 23, the arm 152 may be curved, the arm carrying the brake shoe 153.

In all forms of the invention, hereinbefore described, the vehicle must be backed to permit the rack to ride through the pinion on the rear axle, the brake arms being thereby permitted to assume an uplifted position.

Having thus described the invention what is claimed is:—

1. In a device of the class described, a rotatable vehicle axle; a brake arm pivotally supported upon the axle for rotation thereon, with the axle as an approximate center; elements upon the axle and upon the arm, normally out of engagement and adapted to co-act to swing the arm about the axle as an approximate center, thereby to drive the arm positively into a depending position to engage the road-way; a traction wheel upon the axle and independent of said elements; and means for maintaining the arm uplifted to hold said elements out of engagement.

2. In a device of the class described, a rotatable vehicle axle; a pinion secured to the axle; a brake arm pivotally supported by the axle and having a curved rack, eccentric to the pinion and adapted to engage the pinion, but normally out of engagement with the pinion, the co-action between the rack and the pinion serving to lower the arm into depending position to engage the roadway; and means for maintaining the arm uplifted, to hold the rack and pinion out of engagement.

3. In a device of the class described, a driven vehicle axle; a pinion secured thereto; a brake arm pivotally supported upon the axle and inclosing the pinion, the brake arm being provided with a rigid rack adapted to engage the pinion to depress the brake arm to engage the roadway; means for maintaining the arm uplifted, to hold the rack and the pinion out of engagement; and a fixed stop supported by the vehicle axle, there being a shoulder in the brake arm adapted to engage the stop to maintain the brake arm at an angle to the roadway, when the brake arm is in engagement with the roadway.

4. In a device of the class described, a driven vehicle axle; an eccentric supported by the axle; a brake shoe pivotally mounted upon the eccentric, and housed at its free end behind the vehicle wheel when the arm is elevated, the eccentric constituting a means for projecting the free end of the arm beyond the periphery of the wheel when the arm is lowered; a pinion secured to the vehicle axle; a rack carried by the brake arm and normally out of engagement with the pinion, the rack and the pinion co-acting to drive the brake arm positively into depending position; and means for raising the brake arm.

5. The combination with the front and rear axles of a vehicle, of earth-engaging brake arms pivotally carried thereby; interengaging elements upon the arms and the axles to drive the arms into earth-engaging positions; separate devices for maintaining the interengaging elements out of engagement, and for bringing the interengaging elements into engagement; and a shaft operatively connected with one axle and with both of said devices.

6. The combination with the front and rear axles of a vehicle, of earth-engaging brake arms carried thereby; interengaging elements upon the arms and upon the axles, to drive the arms into earth-engaging positions; separate devices, individually under the control of the operator, for maintaining the interengaging elements out of engagement, and for bringing the interengaging elements into engagement; an engine shaft operatively connected with one axle to drive the same; and co-acting means upon the engine shaft and upon both of said devices, whereby the engine shaft may constitute a power driven member adapted to bring either of said elements into engagement.

7. In a device of the class described, a power driven rear axle; a brake arm pivoted thereto; elements upon the axle and rigid upon the arm, normally out of engagement and adapted to co-act when the axle is rotated, to swing the arm positively into depending position to engage the roadway with the axle as an approximate center of swinging movement; means for maintaining the arm uplifted to hold said elements out of engagement; and a traction wheel upon the axle.

8. The combination with the front and rear axles of a vehicle, of earth-engaging brake arms carried thereby; interengaging elements upon the arms and upon the axles to drive the arms into earth-engaging positions; an engine shaft operatively connected with one axle; spaced shafts journaled for rotation transversely of the engine shaft; a set of pinions upon the engine shaft; a set of pinions upon the transverse shafts, one of which sets is continuously toothed, the other of which sets is but partially toothed, to engage with the teeth of the other set; means for connecting each of the pinions of the transverse shafts with one set of interengaging elements, to bring said elements into engagement; and means for operating each of the transverse shafts separately, and independently of the engine shaft.

9. The combination with a rotatable vehicle axle, of a fixed casing thereon, provided with an eccentric portion; a brake arm having a head located within the casing and mounted for rotation upon said eccentric portion, the head being provided with a rack; a pinion secured to the vehicle axle within the contour of the head; and means for manipulating the arm to bring the rack into engagement with the pinion; whereby the pinion will effect a positive driving of the brake arm into engagement with the ground.

10. The combination with a rotatable vehicle axle, of a fixed casing thereon, provided with an eccentric portion; a brake having a head located within the casing and rotatable upon said eccentric portion, the head being provided with a rack; a pinion fixed upon the axle and located within the head, the pinion being normally out of engagement with the rack, but being adapted to interengage with the same when the brake is moved upon said eccentric portion; and a fixed stop carried by the casing, there being a shoulder upon the brake head, adapted to interengage with the stop, to maintain the arm in earth-engaging position.

11. The combination with a vehicle axle, of an earth-engaging brake arm carried thereby; interengaging elements upon the axle and upon the arm, to swing the arm into earth-engaging position; an engine shaft operatively connected with the axle; a shaft journaled transversely of the engine shaft; intermeshing pinions upon the transverse shaft and upon the engine shaft, one of said pinions being but partially toothed; means for operating the transverse shaft; and means for operatively connecting the transverse shaft with the interengaging elements.

In testimony that I claim the foregoing as my own, I have hereto affixed my signature in the presence of two witnesses.

JOHN G. MILLER.

Witnesses:
J. T. ILLICK,
DALL R. ANDRE.